Aug. 8, 1950　　　　　　　H. G. BUSIGNIES　　　　　2,517,540
DISTANCE MEASURING SYSTEM
Filed Aug. 11, 1945　　　　　　　　　　　　　　　5 Sheets-Sheet 1

INVENTOR.
HENRI G. BUSIGNIES
BY
R. V. Morris
ATTORNEY

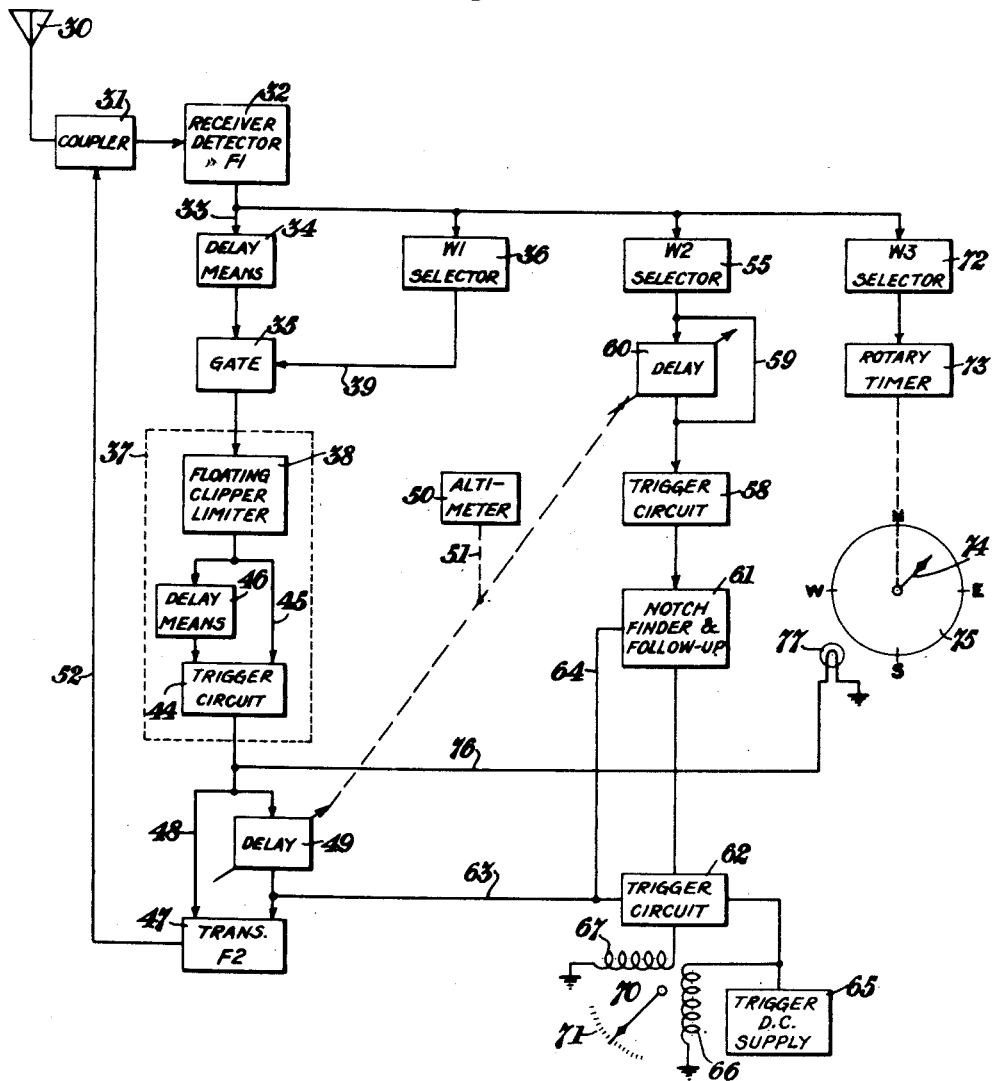

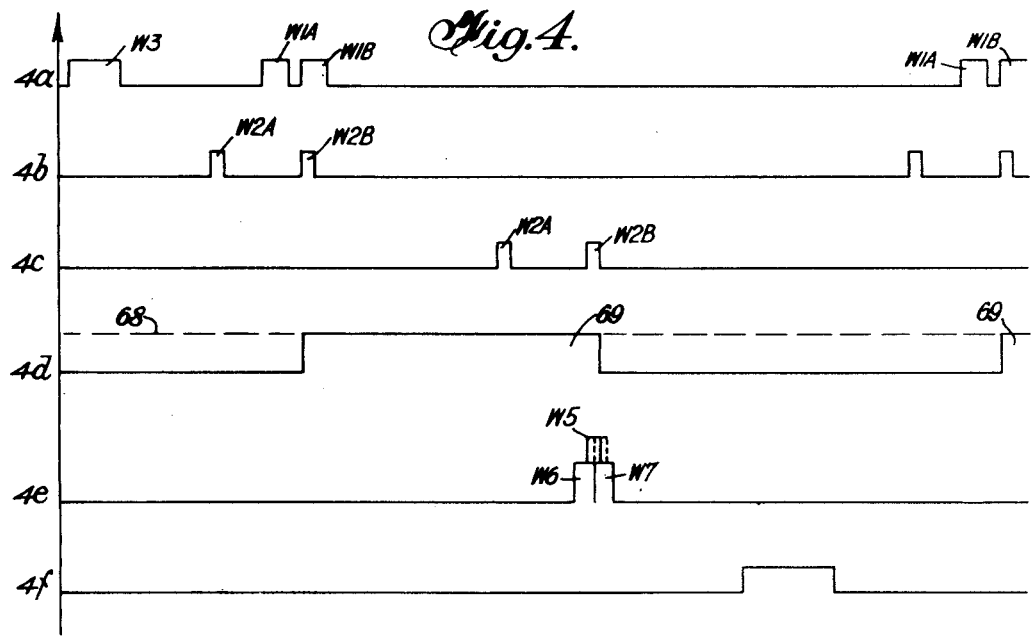
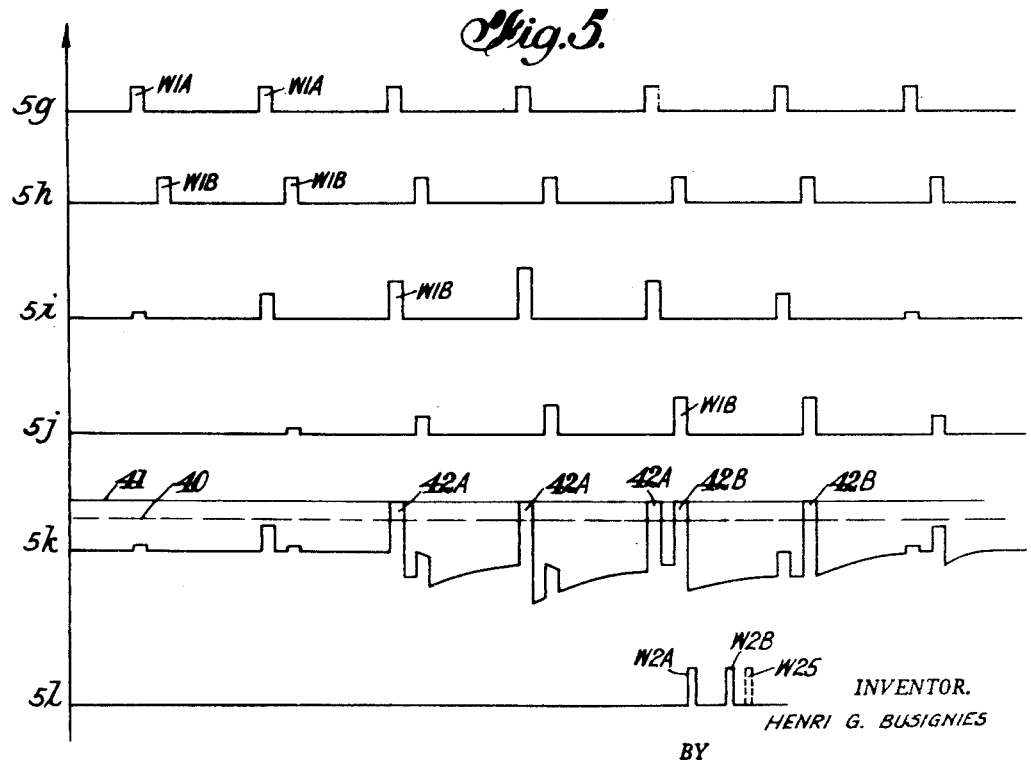

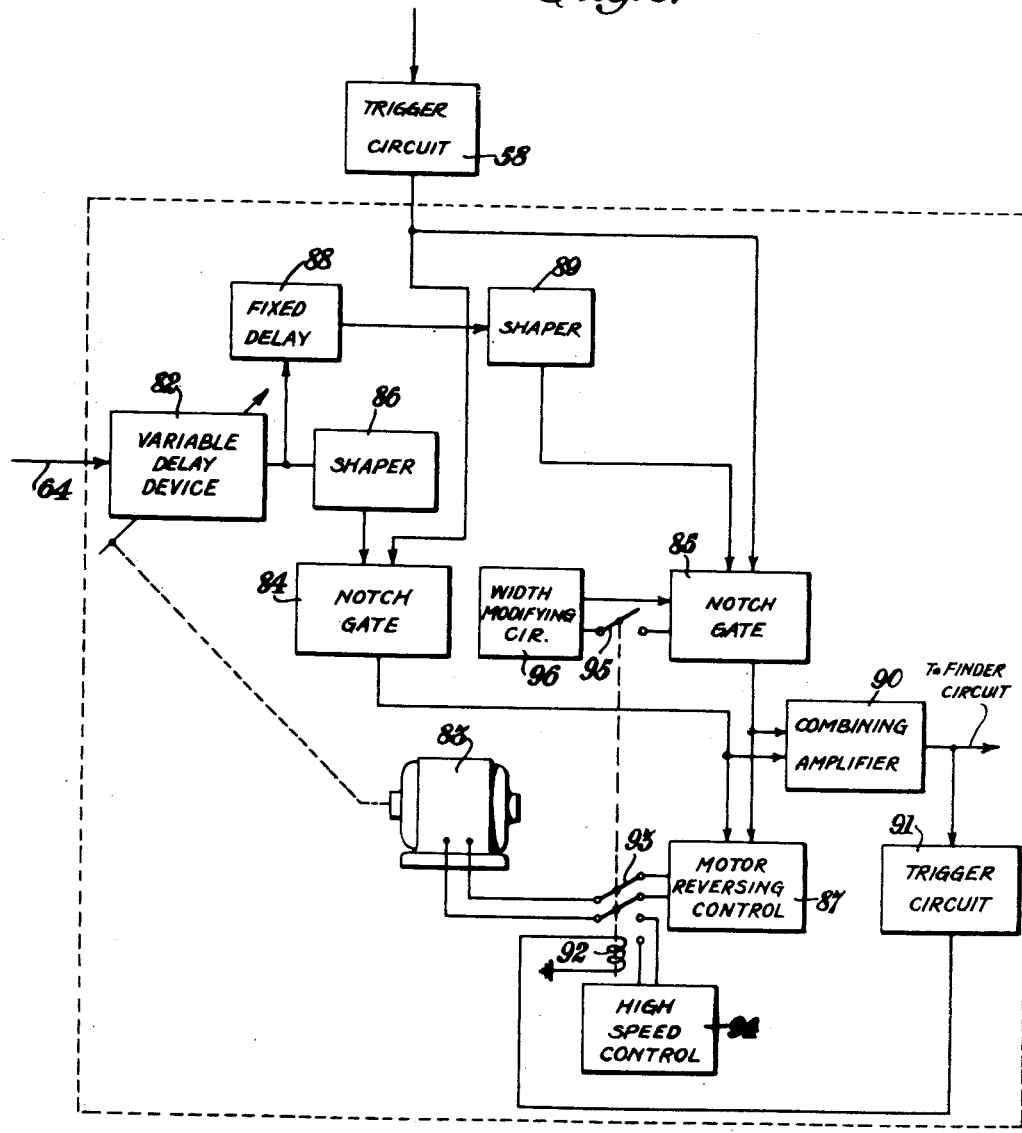

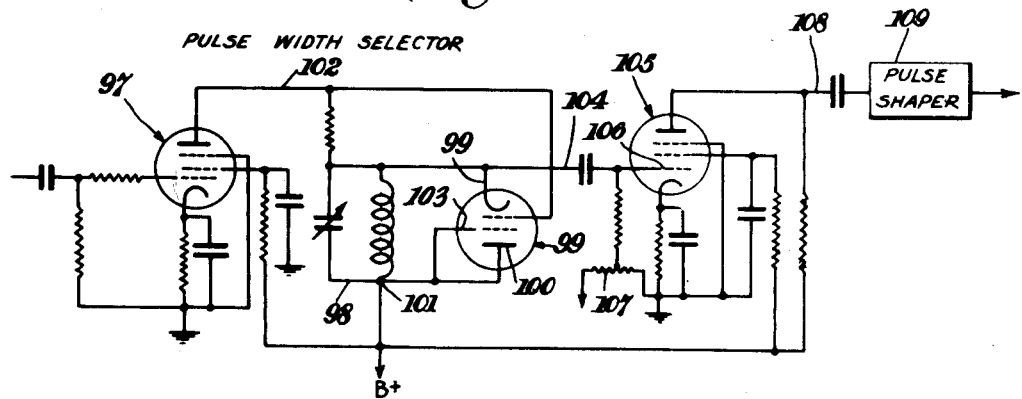
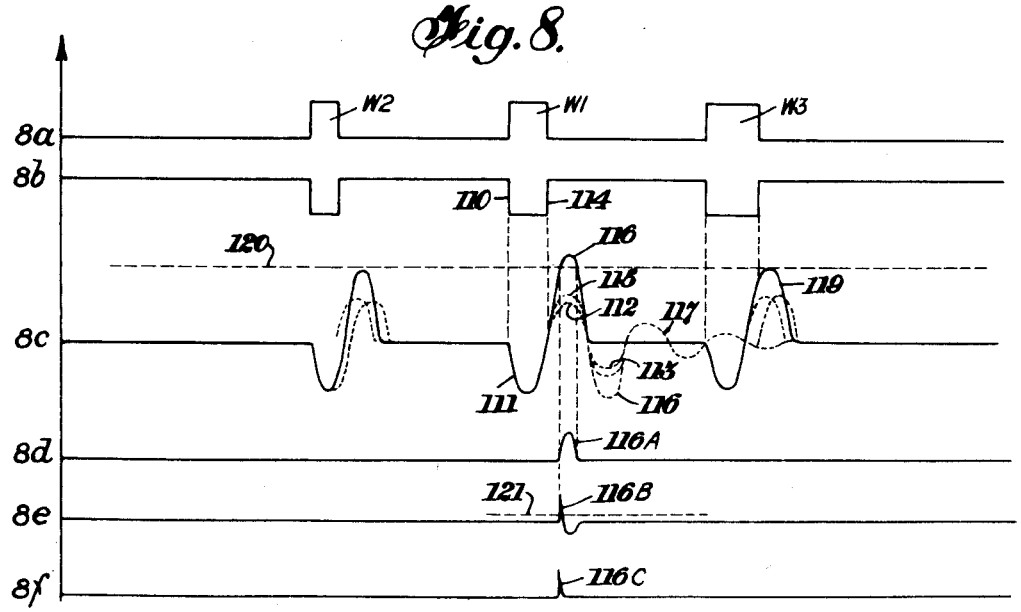

UNITED STATES PATENT OFFICE 2,517,540

DISTANCE MEASURING SYSTEM

Henri G. Busignies, Forest Hills, N. Y., assignor to Federal Telephone and Radio Corporation, New York, N. Y., a corporation of Delaware Application August 11, 1945, Serial No. 610,367

21 Claims. (Cl. 343—6)

This invention relates to radio guiding systems and more particularly to radio systems for indicating the distance and/or azimuth of receivers with respect to a rotatable radio beacon.

A number of radio beacon systems have been proposed wherein the position of a craft relative to a radio lighthouse or beacon may be indicated on the craft simultaneously with the position of other craft in the neighborhood thereof. These proposed systems generally utilize a cathode ray indicator arrangement on the craft in order to display the positions of the craft relative to the radio lighthouse or beacon.

In some instances, elaborate systems which will enable aircraft to know the location of other craft in their vicinity is unnecessary, but it is desirable that the aircraft be provided with an indication of its distance from a radio beacon or lighthouse and/or an indication of the azimuth position of the craft with respect to the radio lighthouse. In order that a single radio lighthouse may serve a plurality of craft substantially simultaneously and that the equipment on the craft be simplified so that directional reception is unnecessary and the azimuth and distance indications may be produced on simple visual indicators, for example of the electric meter type, it is essential that the lighthouse radiator be capable of discriminating among airplanes or other craft located in different azimuth positions. Furthermore, it is useful if such a system be provided to distinguish among craft at different altitudes so that as long as the various craft maintain a predetermined altitude separation and a predetermined distance one from another, the indications may be made on each craft without interference from the other craft. Since in general, the number of any craft in a given azimuth position will be relatively few and these azimuth positions will usually not last for any appreciable period of time, such a system will serve to distinguish among quite a large number of craft in the vicinity of each beacon station without producing dangerous interference or overlapping of the signals.

It is an object of my invention to provide a simple distance indicating system wherein the distance of an object from a rotating directive beacon may be indicated at the object exclusive of indications from other spaced objects.

It is another object of my invention to provide a distance and/or azimuth indicating system for use on craft wherein distance indications and/or azimuth indications may be produced on the craft independent of signals from other craft.

It is a further object of my invention to provide a radio lighthouse system wherein signals from each of a plurality of craft are distinguished one from another by distinctive signal indications, for example indications in altitude, and in which the signals are likewise selectively distinguished in azimuth directions whereby interfering signals will not be produced for individual craft separated by predetermined azimuth angles and by predetermined altitude differences.

It is a still further object of my invention to provide in a system such as recited immediately hereabove, further means whereby craft separated from one another by a predetermined distance even though in substantially the same azimuth angle and at substantially the same altitude may provide indications of their position indications independent of one another.

According to a feature of my invention, I provide a radio beacon or lighthouse system wherein a directive beacon signal, for example of the crossed pattern type, is rotated at a predetermined speed. Simultaneously with rotation of the directional transmitting antenna is rotated a directive receiving antenna. Each craft cooperating with the radio lighthouse system is provided with a receiver for receiving the directive signal transmitted from the beacon and retransmitting from the craft in response to this received signal, when aligned therewith in azimuth, a signal which may have a predetermined distinctive characteristic, for example, dependent upon the altitude or barometric indication thereon, of the craft. This retransmitted signal is received on the directive receiving antenna at the lighthouse station and repeated therefrom, for example, over an omnidirectional antenna. This repeated signal from the lighthouse station is then received at the craft and compared in time with the signal transmitted from the craft whereby the distance of the craft from the beacon or lighthouse may be indicated. In the craft receiver is provided means for selecting repeated signals of the characteristic corresponding to its altitude so that the indicator will not respond to signals retransmitted from other craft at different altitudes. Furthermore, the receiving circuit may be provided with a "notch gate" follow-up system which will cause the receiver to be selective only of distance indicating signals corresponding substantially to the distance of the craft from the lighthouse so that other craft at the same altitude and azimuth will not affect the indications on any particular craft.

To indicate the azimuth position, I provide means for transmitting from the radio lighthouse a different distinctive reference signal when the directive transmitter and receiver are facing some predetermined reference direction such as north, for example, which in turn may synchronize equipment on the craft so that upon reception of the directive signal on the craft the azimuth indication may be provided.

While I have outlined above, in general terms, some objects and features of my invention, a better understanding of my invention and the objects and features thereof may be had from the particular description of an embodiment thereof made with reference to the accompanying drawings, in which:

Fig. 3 is a schematic block circuit diagram of the aircraft receiver equipment for use in the systems in accordance with my invention;

Figs. 4 and 5 are graphical representations useful in explaining the operation of the systems shown in Figs. 2 and 3;

Fig. 6 is a schematic block circuit diagram of a notch finding and follow-up system used in the equipment shown in Fig. 3;

Fig. 7 is a typical pulse width selector system useful in the system shown in Fig. 3; and Fig. 8 is a graphical representation of curves used in explaining the operation of the width selector of Fig. 7.

Figure 1:
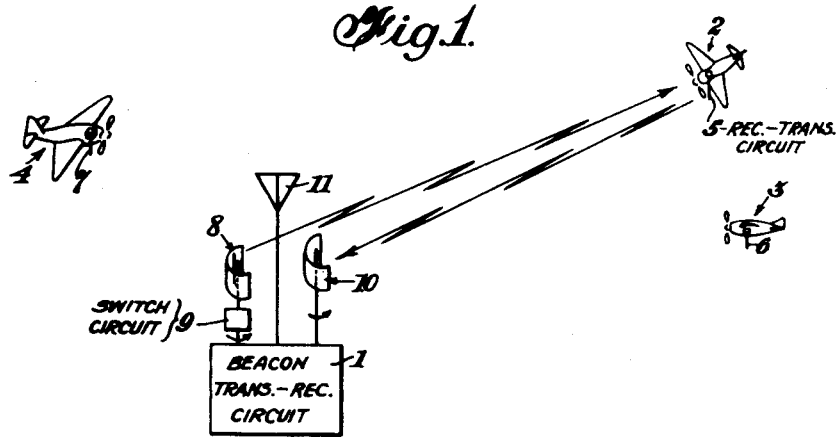
Fig. 1 is a simplified system diagram illustrating a control arrangement in accordance with the principles of my invention.

Turning first to Fig. 1, a beacon transmitter-receiver circuit is shown generally at 1 while three craft 2, 3 and 4, each provided with respective receiver-transmitter circuits 5, 6 and 7, are provided for cooperation with the beacon transmitter-receiver circuit. At the beacon transmitter circuit, the directive antenna 8 through switching circuit 9 serves to transmit a characteristic signal, for example alternately overlapping patterns. A directive receiving antenna 10 is provided and antennas 8 and 10 are rotated together in synchronism. Signals from antenna 8 are received on each of the craft in succession in accordance with their azimuth positions. For example, as illustrated, the antennas 8 and 10 are aligned in such azimuth direction as to cooperate with craft 2. The energy from antenna 8 is received in receiver 5 and repeated thereat with some distinctive signal characteristic preferably a signal indicative of the barometric altitude indication of the craft. This distinctive signal is received on antenna 10 and retransmitted from an omnidirectional antenna 11. The craft receiver-transmitter circuit 5 is adjusted so that it will select signals repeated from antenna 11 having the distinctive characteristics imparted at craft 2 to the exclusion of other similarly directed signals. These signals will then serve to operate together with the signals transmitted from the craft to provide a distance indication of this craft with respect to beacon 1. Omnidirectional antenna 11 may likewise serve to transmit a signal of a still different characteristic which is receivable on all of the craft at the instant when antennas 8 and 10 are in a predetermined azimuth direction as, for example, true north. In each of the craft are provided indicators which may be synchronized with this true north signal and also operated by the directed signal from antenna 8 when received so that the azimuth of each beacon circuit may be indicated on the craft.

It will be evident that with this type of system all of the directive control may be concentrated on the ground station so that each craft need carry only a simple omnidirectional antenna. Furthermore, since both the distance and azimuth signals are controlled by radiations from the ground transmitter, simple indicating equipment responsive to signals therefrom will serve to produce the desired azimuth and distance indications on each craft. Because of the directive characteristic of the beacon transmitter, only craft in the same azimuth direction will receive the energy transmitted from antenna 8 and likewise receiver 10 will be responsive only to signals reradiated from craft in this particular narrow azimuth direction. Because of the altitude signals transmitted from each craft, those craft at the same azimuth direction from beacon 1 but at different altitudes will likewise receive only their own characteristic distance indicating signals so that interference and incorrect indications of distance will be avoided. In addition to the controls which are clearly evident from the illustration of Fig. 1, I preferably provide in each craft a further selective means, or notch finder and follow-up system to be described later, which will find the signals substantially indicative of a predetermined distance range of the craft from the station and will follow-up these signals to maintain the distance indicator responsive substantially only to signals within this predetermined distance range. Accordingly, by the use of this system, the craft may be distinguished from one another by distance of separation as well as by altitude and azimuth.

Turning now to the more specific transmitter and receiver circuits shown in Figs. 2 and 3, a more particular description of the system will be given, reference also being made to certain of the curves in Figs. 4 and 5 to explain the operation.

Figure 2:
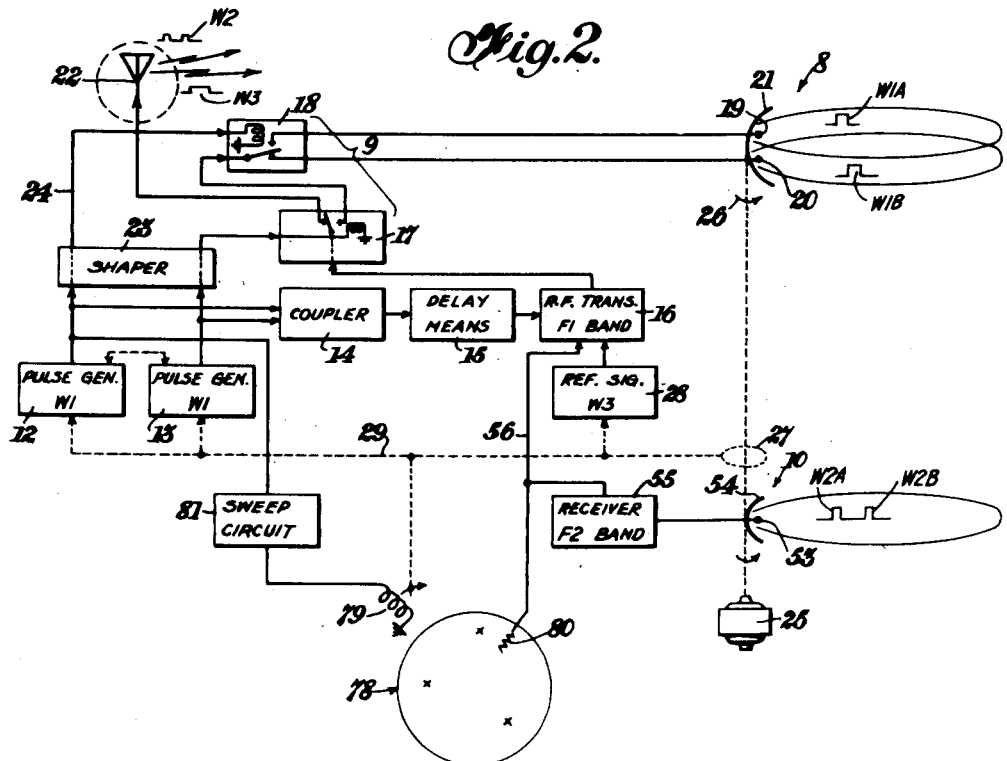
Fig. 2 is a schematic block circuit diagram of a radio lighthouse transmitter system operating in accordance with my invention.

In Fig. 2 are provided two pulse generator circuits 12 and 13 of a predetermined characteristic, for example pulses of a given width W1. Generators 12 and 13 are preferably arranged to produce the separate pulses in a predetermined time spaced relation as indicated at W1A, W1B of Fig. 4. While for simplicity, I have illustrated separate pulse generators for this purpose, it is clear that the pulses of this time spaced relation may be produced by other means. These pulses may be combined in coupler 14 and applied over a delay means 15, radio frequency transmitter 16, pulse switch 17 and keyer 18 to the respective antennas 19 and 20 arranged within a common reflector screen 21. Transmitter 16 operates at a given frequency or within a given frequency band which may be indicated as F1. If a plurality of different signals are to be transmitted over the system, the band F1 may comprise a plurality of closely related different frequencies within this band. However, for simplicity of description, multiplex operation of the system will not be explained in detail. Switch 17 is normally arranged so that energy from transmitter 16 will pass directly through the switch to an omnidirectional radiator 22. However, whenever a generator, for example 13, is operated, the pulse switch 17 is connected so that the pulses from generators 12 and 13 will be sent out through keyer 18 to the antennas 19 and 20. In order to operate the switch 17, pulses from generator 13 are passed through a shaper circuit 23 which serves to widen these pulses sufficiently to include a time greater than that occupied by the pair of pulses W1A, W1B. This widened pulse serves to switch the output of transmitter 16 to keyer circuit 18. Instead of broadening one pulse, the joint outputs of 12 and 13 may be combined and reshaped and serve to operate switch 17 so that the pulses from transmitter 16 will be applied through the switch 17 and keyer 18 to the antennas 19 and 20. Delay means 15 is provided so that the pulses to be transmitted will be delayed in time sufficiently always to fall within the period of operation of pulse switch 17 into coupling position with keyer 18. Keyer 18 may normally be connected to pass signals from the output of switch 17 through to antenna 20. However, pulse W1A, produced in generator 12, is applied over shaper 23 and a control lead 24 to keyer 18 serving to switch output line from pulse switch 17 into cooperation with antenna 19. Thus, the different pulses W1A and W1B will be transmitted from antennas 19 and 20 respectively, and will have a predetermined time spacing determined by the synchronizing of generators 12 and 13.

The antenna system 8 consisting of antennas 19 and 20 and reflector 21 is rotated at a predetermined speed by a drive means such as motor 25 in the direction indicated by arrow 26. Simultaneously with the rotation of antenna 8 a control cam 27 is rotated which serves when antenna 8 is aligned in a predetermined direction to produce a reference signal of predetermined characteristic such as width W3 in reference signal generator 28. The reference pulse W3 is shown in curve 4a of Fig. 4. This reference pulse W3 passes through radio frequency transmitter 16 and pulse switch 17 to omnidirectional antenna 22. At the same time, reference pulse W3 is generated, cam 27 serves through the control indicated at dotted lines 29 to block pulse generators 12 and 13 so that pulses W1A and W1B will not be transmitted while the reference pulse is being transmitted.

Turning now to Fig. 3, the pulses W1A and W1B will be received on antenna 30 when the transmitting antenna 8 is aligned therewith in azimuth. These received signals are applied over a coupler 31 to a receiving detecting circuit 32. The detected signals from 32 are applied over a line 33 to a delay means 34 and a gate circuit 35. Gate circuit 35 is controlled so as to pass pulses only when properly energized by output energy from a selector circuit 36. Selector circuit 36 coupled to the output of receiver-detector 32 is adjusted to select only signals of the desired characteristic, in this case width W1. Accordingly, when the signals W1 are received, these pulses will pass through width selector 36 and line 39 to gate circuit 35 permitting the pulses of width W1 from receiver 32 to pass therethrough. The delay means 34 is provided to take care of the inherent delays in width selector 36 so that the desired pulses will arrive at gate circuit 35 in proper time relation with selected pulses from selector 36. These pulses are then applied to a selecting circuit 37 which serves to pass only the received pulses W1A and W1B when they arrive substantially at equal amplitudes. The operation of this circuit 37 may be better understood by referring to the graph of Fig. 5. In this figure, the curves 5g and 5h illustrate the keying pulses W1A and W1B as passed by width selector 39 to the gate circuit 35. The received pulses which pass through delay means and gate circuit 35 to the selector 37 are illustrated in curves 5i and 5j. It will be noted that these pulses arrive at different amplitudes because of the different directive patterns of antennas 19 and 20 and that the received pulses are of varying amplitudes which are not equal over most of the curve. These two pulse trains are applied to a floating clipper-limiter circuit 38 which is provided with a variable biasing circuit which will produce a given bias indicated at 40 in curve 5k of Fig. 5 and which will saturate at a given fixed amplitude 41, curve 5k. The combined pulses in the output then will be as shown in curve 5k. It will be noted that the differences in amplitudes of these waves may be somewhat emphasized because of the floating bias in the clipper circuit 38 and the pulses will appear as single pulses 42a and 42b except where substantial equality of the pulses W1A and W1B exists. At this point, as shown at 42A, 42B, both pulses of width W1A and W1B will be passed. This output train from floating clipper-limiter is applied over a selective circuit which will respond only when two pulses of the proper spaced relation are applied thereto. To this end the output from clipper-limiter 38 is applied to trigger circuit 44 over two paths; without delay over a line 45 and over delay means 46. Delay means 46 is made substantially equal to the delay time between pulses W1A and W1B so that when these two pulses appear in the output of clipper-limiter 38 they will be applied simultaneously to trigger circuit 44. The trigger circuit is adjusted so that it will respond only to the double pulse produced by superposition of the pulses in the two paths and not to the single pulses such as 42A and 42B.

The trigger pulses occurring in the output of trigger circuit 44 correspond to the period when the beacon beam is aligned in azimuth substantially with the receiving antenna 30. These pulses from the output of trigger circuit 44 may then be applied directly to transmitter 47 over a line 48 and to the same transmitter 47 over a variable delay line 49. Variable delay line 49 is controlled by an altimeter 50 as indicated by the dotted lines 51 so that it will produce a delay equivalent to the altitude indications on the craft so that two spaced pulses will be provided as shown at W2A and W2B of curve 5l, Fig. 5. These pulses have a different characteristic from the received pulses W1A and W1B and as used in this particular example a different narrower width is used. Should the altimeter reading vary, pulse W2B may be produced with a different spacing from pulse W2A as indicated by the dotted line of curve 5l. These pulses serve to modulate the energy of transmitter 47 which preferably operates at a different radio frequency F2 from that of the beacon transmitter. This modulated pulse energy from transmitter 47 is then applied over line 52 and coupler 31 to antenna 30 for retransmission.

The retransmitted pulses W2A, W2B are received at the beacon lighthouse station on antenna 10 which comprises a receiving antenna 53 which may be provided with a directive reflector 54. Antenna 10 is rotated by motor 25 in synchronism with antenna 8. The received radio frequency is then applied to receiver 55 tuned to the frequency F2 and these detected signals are applied over line 56 to transmitter 16 and over switch 17 to omnidirectional antenna 22 for reradiation.

The reradiated pulses at frequency F1 and of width W2 are received on antenna 30, Fig. 3, and applied over coupler 31 and receiving detector 32 to output line 33. Because they are not of the proper width to pass through width selector 36, these pulses will not pass gate 35 and so will not affect the transmitter 47. However, a second width selector circuit 55 coupled to line 33 serves to select the received retransmitted pulses W2A and W2B and apply them to a trigger circuit 58 directly over line 59 and simultaneously over a delay means 60 so that the trigger circuit 58 will be operated only when both pulses of proper spacing as determined by delay line 60 are applied thereto. The delay means 60 is preferably made identical with delay means 49 and is simultaneously controlled so that their delays are identical. As a consequence, only pulses having a delay time corresponding to the altimeter 50 will operate trigger circuit 58.

The trigger output pulses from circuit 58 are passed through a notch finder and follow-up circuit 61 to a double action trigger circuit 62. The notch follow-up circuit is controlled by the delayed pulses from the output of delay device 49 over lines 63 and 64 to provide a notch gate so that only pulses arriving with approximately the proper time delay will pass through this circuit to trigger circuit 62. This notch finder and follow-up circuit will be described in greater detail later in connection with Fig. 6.

Output pulses from delay device 49 are also applied over line 63 to trigger circuit 62. A direct current supply 65 serves to furnish the direct plate potential of trigger circuit 62 and simultaneously to provide a current through meter coil 66. The output of trigger circuit 62 is coupled to another meter coil 67. Operation of this trigger circuit may be better understood from the explanation made with reference to curves 4b, 4c and 4d of Fig. 4. Since a constant D. C. is suplpied through the trigger circuit, a normal constant D. C. level 68, curve 4d, will exist across this circuit. Upon the arrival of pulse W2A delayed by line 49 to correspond in position to pulse W2B of Fig. 4b, the trigger circuit will be operated to connect the voltage source 65 directly to coil 67. This connection will be maintained until the delayed received pulse corresponding to W2A is applied from the output of notch follow-up 61 at which time the trigger circuit will be cut off and the D. C. potential will also be cut off from coil 67. Thus, in coil 66 there will be a constant D. C. current at the level represented by line 68 of curve 4d while through coil 67 there will be an intermittent D. C. potential represented by the solid line pulses 69 of curve 4d. As a consequence, the ratio of energy between these two currents will be an indication of the time difference between the transmitted pulses W2A and the received repeated pulses W2B which will correspond to distance of the receiver-transmitter equipment from the beacon station. Indicator meter hand 70 of Fig. 3 will thus take a position corresponding to the distance and the scale 71 may be calibrated to provide indications directly of distance.

The azimuth indications may likewise be provided for the system, if desired, and may be explained as follows. When the reference pulse W3 is transmitted from antenna 22, this pulse will be received on antenna 30, Fig. 3, and passed through coupler 31 and receiver-detector 32. However, since this reference pulse differs in width from the W1 and W2 pulses, it will not be selected at either 36 or 55 but will be selected only at W3 width selector 72. This pulse may serve to synchronize a rotary timer circuit 73 which is adjusted to provide one rotation substantially in the same time interval as the rotation of the direction antennas of Fig. 2. This rotary timer may then serve to rotate an indicating hand or other indicating means 74 with reference to a fixed scale 75. Under normal conditions, indicator 74 is not illuminated and will not be readable. However, upon reception of the W1 pulses from the output of selector circuit 37, these pulses will be applied over line 76 to a lamp 77 to produce an illumination of indicating hand 74 at a time corresponding to the reception of these pulses. Since the pulses in the output of trigger circuit 44 are applied only when the transmitting antenna 8 is aligned in azimuth with antenna 30, lamp 77 will be illuminated only when the proper azimuth indications are applied and therefore the indicating hand 74 will provide an indication of azimuth of the craft with respect to the beacon. Other simple types of azimuth indicators responsive to the various signals will readily present themselves to one skilled in the art.

At the radio beacon station, a display indication of all craft in the vicinity of the beacon may be provided, if desired. For this purpose, I may provide an indicator 78 (Fig. 2) which may, for example, be a cathode ray oscilloscope provided with a rotatable deflecting coil 79 and a control grid 80. Sweep circuit 81 is controlled to produce a radial sweep voltage in synchronism with the generator of pulses in generator 12 and the coil 79 is simultaneously rotated about the screen of cathode ray screen 78 in synchronism with the rotation of directive antennas 8 and 10. Grid 80 is normally biased so that the cathode ray beam will produce no indication on the screen. The output signals from receiver 55 are also applied to grid 80. When these signals arrive they are sufficient to overcome the normal bias of grid 80 and produce on the screen of tube 78 indications or spots of light, the angular displacement of which corresponds with the azimuth of the source from which these signals are received and the radial distance of which corresponds to the distance of the objects from the beacon. In general, the altitude indications of the received circuits may be of sufficiently small difference with respect to the distance measure that they will not produce on the screen double indications. However, if wide spacing of the pulses with respect to altitude is desired, then some system may be provided in the circuit so that grid 80 will respond only to the first received of these pairs of pulses.

The notch gate follow-up and finder circuit illustrated in simple block in Fig. 3 may be of the type, for example, illustrated more particularly in Fig. 6. As shown in Fig. 6 the selected pulses of a width which may be the same as width W1 may be applied over line 64 to a variable delay device 82. This variable delay device is driven by a motor 83 which rotates to advance the delay of the variable delay device a given amount, for example one-half the width of the pulse W5 (see curve 4e), from trigger circuit 58 for each normal rotation of the radio beacon, when driven in one direction and retard the delay one-half this distance when driven in the other direction. The pulses W5, therefore, are caused normally to fall equally on two control pulses W6, W7 applied to notch gate circuits 84, 85. When so equally applied, the motor will be retained in a stationary condition.

These gate control pulses are shown in Fig. 4, curve e, W6 and W7. Pulses W6 and W7 may be derived directly from the incoming pulses. The output of the variable delay device 82 which may, for example, be a trigger circuit of the multivibrator type, will generally be relatively wide pulses with sloping sides. In order that they may be used properly for control, these pulses must be narrowed down preferably to a width less than the normal separation that is to be maintained between craft using the system. It will be clear, however, that these pulses should be sufficiently long in time duration so that the craft will not pass beyond such a pulse in two or three seconds of time. This is desirable since should the signal fade for two or three revolutions of the lighthouse transmitter, the craft might pass completely beyond the notch gate control unit and so the follow-up could not be properly performed. Accordingly, the pulses from the output of delay device 82 are passed through a shaper network 86 which serves to reshape these output pulses and narrow them down. These output pulses W6 from 86 are applied to notch gate 84 so as to bias it sufficiently positive to pass any pulses applied thereto. Thus, any output pulses from trigger circuit 58 which occur during the application of pulse W6 to notch gate 84 will therefore be passed on to the motor reversing control mechanism 87.

Output pulses from delay device 82 are also applied over a fixed delay circuit 88 to a second shaper circuit 89 and from there to notch gate 85. These pulses correspond to W7 shown in Fig. 4 and are delayed sufficiently to align them substantially side by side as shown. Pulses W5 from 58 are also applied to notch gate 85 and, if they are applied during the interval when pulses W7 are present, from there to motor reversing control 87. Motor reversing control mechanism is preferably a balancing circuit which will rotate the motor in one direction when the output from gate 84 exceeds that from gate 85 and in the opposite direction if the excess outputs are reversed. It will therefore be seen that as long as pulse W5 is properly timed with respect to pulses W6 and W7 that the motor 83 will remain stationary. However, as the craft carrying the receiver moves, the pulse W5 may be displaced to one side as shown in dotted lines, curve 4c, Fig. 4, causing pulse W5 to overlap pulse W7 to a greater extent than W6. This unbalance will be applied to the motor reversing control and will cause motor 83 to operate in one direction until balance is restored. This will displace the variable delay device 82 sufficient to move the notch gate pulses W6 and W7 over a fraction of the width of pulse W5. Accordingly, if the craft does not move during the next revolution of the beacon the pulse W5 will again fall equally astride pulses W6 and W7 and the motor will remain stationary. However, if the craft continues to move in distance tending to displace pulse W5, the gate pulses W6 and W7 will tend to follow it up so as to maintain the motor at all times substantially aligned with the distance indication.

The output from notch gates 84 and 85 is also combined in combining amplifier 90 which serves to clip the combined pulse such as shown in curve 4e, Fig. 4, to pass the pulse W5 to the triggering circuit 62, Fig. 3. It will thus be clear that as long as the distance indication is maintained substantially within the proper distance, the indicator of Fig. 3, will serve to show the precise position of the craft. However, when the craft first comes into the field of the beacon or if the notch follow-up becomes aligned temporarily with false pulses from some other craft, the distance indication may be in error and some means must be provided to find the notch. To this end, the pulse W5 from combining amplifier 90 is also applied to trigger circuit 91 which is maintained inoperative as long as a pulse voltage is applied. However, if the returned pulse passes out of the control of notch gates 84 and 85, pulses no longer will be applied to trigger circuit 91 which then will operate and energize relay winding 92 serving to move relay contacts 93 from connection with the normal motor reversing control 87 to a high speed motor control 94. At the same time, energization of relay winding 92 serves to close a switch 95 connecting a width modifying circuit 96 to one of the notch gates, for example notch gate 85. Thus, this notch gate 85 will be widened so that it will pick up pulses over a wider time area. It should be clear that the width modifying circuit may be also applied to notch gate 84, if desired, but for the present purpose it appears that widening of one of the notch pulses such as pulse W7 will be sufficient. Because of the high speed operation of motor 83 from the control circuit 94, the variable delay device 82 will be operated at a much more rapid rate so that the time position of the pulses W6 and W7 will be altered at a high rate of speed. This alteration will continue until such time as the pulses become coincident in time with an output pulse from trigger circuit 58 at which time a pulse will be passed through the combining circuit 90 serving to render trigger circuit 91 inoperative and deenergize relay winding 92. If the pulse found by the notch gate movement is a proper one, the notch gate will then continue to follow the pulse in the manner previously described. However, if this is also an extraneous pulse, it will soon pass from the field of the receiver system and the hunting circuit will again continue to hunt until the proper pulse is picked up. It should be understood that since the selection of pulses for operation of trigger circuit 58 depends upon the altitude of the craft, there will generally be sufficient variations in altitude so no two craft will long maintain the same altitude separation. However, if it is found desirable, some random alteration of the altimeter movement may be introduced in order to assure that no two craft long maintain the same altitude indication.

The circuit of Fig. 7 showing a typical width selector which may be used for each of the width selectors 36, 55 and 72 of Fig. 3. This selector preferably includes a limit clipping stage 97 as an input coupler which limits all input pulses to substantially the same amplitude. Should the input pulses be of a positive polarity as indicated by the pulses of curve 8a in Fig. 8, the coupler stage 97 also serves to reverse the polarity as indicated by the pulses of curve 8b. This output pulse energy from stage 97 is applied through a resistor R to a shock excitable L-C circuit 98. Connected across the tunable circuit 98 is a vacuum tube 99, the cathode of which is connected to the input side of the circuit 98, while the anode 100 is connected to the opposite side 101 of the tunable circuit. The side 101 is also connected to a source of anode potential. The pulse energy, curve 8b, from the anode connection 102 is applied to the grid 103 of tube 99 so as to block the conduction between the cathode and the anode 100 while pulse energy is applied to the circuit 98. The undulations produced in the circuit 98 in response to pulse energy over anode connection 102 are taken off through a connection 104 for application to a threshold clipping amplifier stage 105. The bias on the grid 106 is controlled by adjustment of resistor 107. In the output 108 of stage 105 is a pulse width shaper 109 the operation of which is hereinafter described.

Assume for purposes of illustration, that the widths of the pulses of curves 8a and 8b correspond respectively, to pulses W1, W2 and W3. Assume also that the circuit 98 is tuned for selection of pulse width W1. Curve 8c represents the output of the circuit 98 when this circuit is tuned for selection of pulse width W1, illustrating the different output undulations for the different pulse widths. When the leading edge 110 of the pulse W1 is applied at negative polarity to circuit 98, an initial undulation 111 is produced which is normally followed by undulations 112, 113 and so on in the form of a damped wave. When the circuit 98 is tuned to a frequency the period of which is exactly twice the width W1, the trailing edge 114 occurs where the initiated oscillatory energy crosses the zero axis from undulation 111 to undulation 112. Since the trailing edge 114 shock excites the circuit in the same direction at this point, the undulation 115 produced thereby in the circuit 98 adds algebraically to the undulation 112 to produce undulation 116. The next succeeding pairs of undulations produced by the leading and trailing edges of pulse width W1 would normally tend to produce a negative undulation 116 which would continue as a damped wave as indicated at 117. The damping tube 99, however, eliminates the trailing oscillations 116, 117 so that they do not interfere with the undulations produced by subsequent pulses applied to the circuit 98.

A pulse width less than pulse width W1 such, for example, as pulse W2, will not produce maximum undulations as great as the undulation 116 for the tuning adjustment corresponding to pulse width W1. This is illustrated by the undulation 118 produced in response to the pulse width W2. The reason for this is readily apparent because the shock excitations produced by the leading and trailing edges of the pulses of lesser width than W2 are in part opposed to each other as indicated by the broken lines associated with the undulation 118. The undulation 119 produced in response to the greater pulse width W3 is likewise smaller than the undulation 116 since here again the oscillations produced in response to the leading and trailing edges of the greater pulse widths are in part opposed to each other so that the algebraic summation thereof is less than in the case of the undulations produced in response to pulse width W1.

The threshold clipping stage 97 is adjusted to clip at a level 120 thereby obtaining and amplifying the crest 116a of the undulation 116 as indicated by curve 9d. The pulse shaper 109 is preferably of the character adapted to differentiate the pulse 116a producing the pulse shape 116b, of curve 8e. The shaper also includes a clipper stage for clipping the positive pulse portion of pulse shape 116b at level 121 thereby producing a pulse 116c synchronized in time to the pulse width W1. It will be apparent that by adjusting the tuning of circuit 98 to another frequency the period of which is twice the duration of any one of the other pulse widths of curve 9a, that a corresponding output pulse will be produced representing the pulses of the pulse width selected.

While I have described a particular embodiment operating in accordance with the principles of my invention, it should be understood that many departures may be made from the specific disclosure within the scope of my invention. The specific form of notch finder follow-up system and width selector circuits need not be adhered to since any apparatus to perform the desired functions may be used. Furthermore, while preferably the indicators used on both the craft are of simple meter type, cathode ray indicators or other known instruments may be used as desired. Also, the various circuits for generating the pulses may be of any desired type and many modifications in the detail networks, shapers and other apparatus used may be applied.

The particular example given herein is made merely by way of illustration and is not intended as any limitation on my invention as set forth in the objects thereof and in the appended claims.

I claim:

1. A radio system for indicating, at each of a plurality of craft, its distance from a predetermined station having a rotatable directive transmitting and receiving means and a retransmitting means, comprising, at each craft, means for receiving directively transmitted signals from said station, means for transmitting a distinctive signal characteristic of the altitude of each craft in response to said received signals, means at said station for receiving said distinctive signals and for retransmitting them, means for receiving selected signals retransmitted from said station, and an indicator responsive to the said transmitted distinctive signal and said selectively received retransmitted signals for indicating the distance of selected craft from said station.

2. A radio method of indication, at each of a plurality of craft, its distance from a predetermined station having a rotatable directive transmitting and receiving means and a retransmitting means, comprising, at the craft, receiving directively transmitted signals from said station, transmitting a distinctive signal characteristic of the altitude of each craft in response to said received signals, selectively receiving on said craft the corresponding signals retransmitted from said station, indicating the distance of said craft from said station in response to said transmitted directive signal and said selectively received signal.

3. A radio beacon station comprising means for transmitting distinctive signals providing directive radiation patterns, means for directively receiving other distinctive signals, means for synchronizing the directivity of the directive transmitting and receiving means, and an omni-directional transmitter, means responsive to said received other signals for modulating the transmitter to omni-directionally retransmit said received other signals.

4. A beacon station according to claim 3, wherein said means for synchronizing comprises means for synchronously rotating said patterns.

5. A radio beacon station comprising means for transmitting distinctive signals providing substantially overlapping directive radiation patterns, means for directively receiving other distinctive signals, means for synchronizing the directivity of the directive transmitting and receiving means, and an omni-directional transmitter, means responsive to said received other signals for modulating the transmitter to omni-directionally retransmit said received other signals.

6. A radio beacon station comprising means for transmitting distinctive signals providing substantially overlapping directive radiation patterns, means for directively receiving other distinctive signals, means for synchronizing the directive transmitting and receiving means, means for transmitting an omnidirectional reference signal, means for retransmitting signals received on the directive receiving means, and means for rendering said first and second transmitting means effective in non-overlapping time phase.

7. A radio indicating system for cooperation with a radio beacon station, said beacon having means for transmitting a directive signal of predetermined characteristics, means for directively receiving signals of a distinctive characteristic, means for retransmitting said received signals comprising an omnidirectional antenna, a receiver for receiving signals of said predetermined characteristic and the signals of said distinctive characteristic retransmitted from said station, selective means for selecting said signals of predetermined characteristics, means for determining from said selected signals when said directed radiation is substantially aligned with said antenna, a transmitter means coupled to said antenna, means responsive to determination of the alignment of the directive radiation of said antenna for keying said transmitter into operation to transmit a signal having said distinctive characteristic whereby it may be received at said beacon station for retransmission, means for selecting said received retransmitted signals, and indicator means responsive to transmission of said signals of said distinctive characteristic and said received retransmitted signals for producing an indication of the distance of said indicator circuit from said beacon station.

8. A system according to claim 7, wherein said radio beacon station includes means for transmitting a reference pulse of a second distinctive characteristic when the directive radiation is aligned with a predetermined reference direction, said indicator circuit further comprising means for selecting signals of said second characteristic, and indicator means synchronized by said selected signal of said second characteristic and responsive to said transmitted signals of said first named distinctive characteristic for indicating the azimuth position of said indicator with respect to said beacon.

9. A system according to claim 7, wherein said indicator system further comprises altitude measuring means, means for impressing said altitude measurement on said signals of said distinctive characteristic to provide a further distinction of said signals, and said selective means for said retransmitted signals comprising means controlled by said altitude measuring means to select only signals having said further distinctive indications.

10. A system according to claim 7, said indicator system further comprising signal finder and follow-up means responsive to said transmitted signals for selecting only such of said received retransmitted signals as correspond substantially with the distance of said indicator from said station.

11. A radio beacon station for cooperating with an indicator system, said indicator system having means for receiving signals of a predetermined characteristic and transmitting distinctive signals in response thereto, comprising directive transmitter means for transmitting directive signals of said predetermined characteristic, directive receiver means for receiving said distinctive signals transmitted from the indicator system, means for synchronizing the directivity of said directive transmitting and receiving means, and an omni-directional transmitter, means responsive to said received other signals for modulating the transmitter to retransmit said received distinctive signals.

12. A radio beacon station according to claim 11, further comprising means for generating a reference signal of a distinctive characteristic, and means for transmitting said reference signal omni-directionally at the times said transmitter means is aligned in a predetermined reference direction.

13. A radio beacon station according to claim 11, further comprising a cathode ray tube display indicator, means effectively rotating the beam of said indicator tube in synchronism with said rotation of said directive transmitting means, sweep circuit means synchronized with said transmitted signal of said predetermined characteristic for producing radial sweep of said cathode ray beam, and means responsive to said received distinctive signals for rendering said cathode ray beam visible on said screen.

14. A radio beacon station according to claim 11, wherein said first named means comprises mean for generating pulses of a predetermined width, a pair of directive radiators providing overlapping patterns, and keyer means for applying pulses of said predetermined width alternately to said two radiators in predetermined time displacement relation.

15. A radio beacon station for cooperating with an indicator arrangement, said indicator arrangement having means for selectively receiving beacon signals and retransmitting distinctive signals of a predetermined characteristic in response thereto, comprising pulse generator means, energy transmitter means, coupling means for coupling said pulse generator means to said transmitter means for modulating the energy, means for directively radiating said modulated energy, directive receiver means for receiving said distinctive signals retransmitted from said indicator arrangement received from said transmitter in response to signals, means for synchronizing the directivity of said directive radiating means and receiving means, and an omni-directional transmitter, and means coupled to said directive receiving means and responsive to received distinctive signals for modulating said omni-directional transmitter to retransmit omnidirectionally said received distinctive signals.

16. In a radio beacon station for cooperating with an indicator system, said indicator system having means for receiving signals of a predetermined characteristic and retransmitting distinctive signals in response thereto, the method of operation comprising directively transmitting signals of said predetermined characteristics, directively receiving said distinctive signals retransmitted from said indicator arrangement, operating the directive transmitting and receiving patterns of said station in synchronism, and retransmitting omnidirectionally said received distinctive signals.

17. A radio guiding system comprising a radio beacon station having means for transmitting a directive signal of predetermined characteristics, means for directively receiving signals of a distinctive characteristic, means for retransmitting said received signals; and means for rotating the directive patterns of said directive transmitter and receiver means; and a cooperating indicator circuit comprising an antenna, a receiver coupled to said antenna for receiving signals of said predetermined characteristics and retransmitted distinctive signals from said station, selective means for selecting said signals of predetermined characteristics, means for determining from said selected signals when said directed radiation is substantially aligned with said antenna, a transmitter means coupled to said antenna, means responsive to determination of the alignment of the directive radiation of said antenna for keying said transmitter into operation to transmit a signal having said distinctive characteristic for reception at said beacon station for retransmission, means for selecting said retransmitted distinctive signals, and indicator means responsive to transmission of said distinctive signals and said received signals of said predetermined characteristics for producing an indication of the distance of said indicator circuit from said beacon station.

18. A radio distance measuring system comprising a sharply directive radiating means, means for transmitting predetermined signals from said radiating means, selective means spaced from said radiating means for receiving said predetermined signals when said radiating means is aligned therewith in azimuth, a transmitter operative in response to said received signals for transmitting distinctive signals identified as to altitude of the receiver means, directive receiver means in the vicinity of said directive radiating means for receiving said distinctive signals, means for retransmitting said distinctive signals, second selective means for receiving and selecting said distinctive signals, and means operative in response to transmission of said distinctive signals and reception of said retransmitted distinctive signals for providing an indication of the time between operation of said transmitter and reception of signals of said different characteristic.

19. A distance indicating system according to claim 18, wherein said last named means comprises a source of constant potential, a ratio measuring means comprising first and second angularly arranged coils, means coupling said source continuously to said first coil, means responsive to said transmitted distinctive signals and said received retransmitted distinctive signals for coupling said source to said second coil during the interval between the said transmission and reception, and indicating means adjusted under control of said first and second coils.

20. A radio distance and azimuth indicating system comprising a sharply directive radiating means, means for transmitting predetermined signals from said radiating means, selective means spaced from said radiating means for receiving said predetermined signals when said radiating means is aligned therewith in azimuth, a transmitter operative in response to said received signals for transmitting distinctive signals identified as to altitude of receiver means, directive receiver means adjacent said directive radiating means for receiving said distinctive signals, means for retransmitting said distinctive signals, second selective means for receiving and selecting said distinctive signals, means operative in response to transmission of said distinctive signals and reception of said retransmitted distinctive signals for providing an indication of the time between operation of said transmitter and reception of signals of said different characteristic, an omnidirectional radiating means adjacent said radiating means, means for transmitting a reference signal corresponding to a particular azimuth direction from said omnidirectional radiating means, means adjacent said first receiver means for receiving said reference signal, and azimuth indicator means responsive to said received reference signal and said received retransmitted distinctive signals for producing an indication of azimuth.

21. A distance indicating system wherein transmitted signals are reradiated from a point to which the distance is to be measured and received at a point adjacent said transmitter, comprising a source of constant potential, a ratio measuring means comprising first and second angularly arranged coils, means coupling said source continuously to said first coil, a switching circuit coupled to said second coil and said source and responsive to said transmitted signals and said received reradiated signals for coupling said source to said second coil during the interval between the said transmission and reception, and indicating means adjusted under control of said first and second coils.

HENRI G. BUSIGNIES.

REFERENCES CITED

The following references are of record in the file of this patent:

UNITED STATES PATENTS

| Number | Name | Date |
| --- | --- | --- |
| 1,894,019 | Buckley | Jan. 10, 1933 |
| 2,075,285 | Hollingsworth | Mar. 30, 1937 |
| 2,165,690 | Wademan | July 11, 1939 |
| 2,252,083 | Luck | Aug. 12, 1941 |
| 2,307,184 | Alford | Jan. 5, 1943 |
| 2,402,459 | Smith | June 18, 1946 |
| 2,409,456 | Tolson et al. | Oct. 15, 1946 |
| 2,418,143 | Stodola | Apr. 1, 1947 |
| 2,424,984 | Hoffman | Aug. 5, 1947 |
| 2,426,217 | Hoisington | Aug. 26, 1947 |